United States Patent Office 2,752,224
Patented June 26, 1956

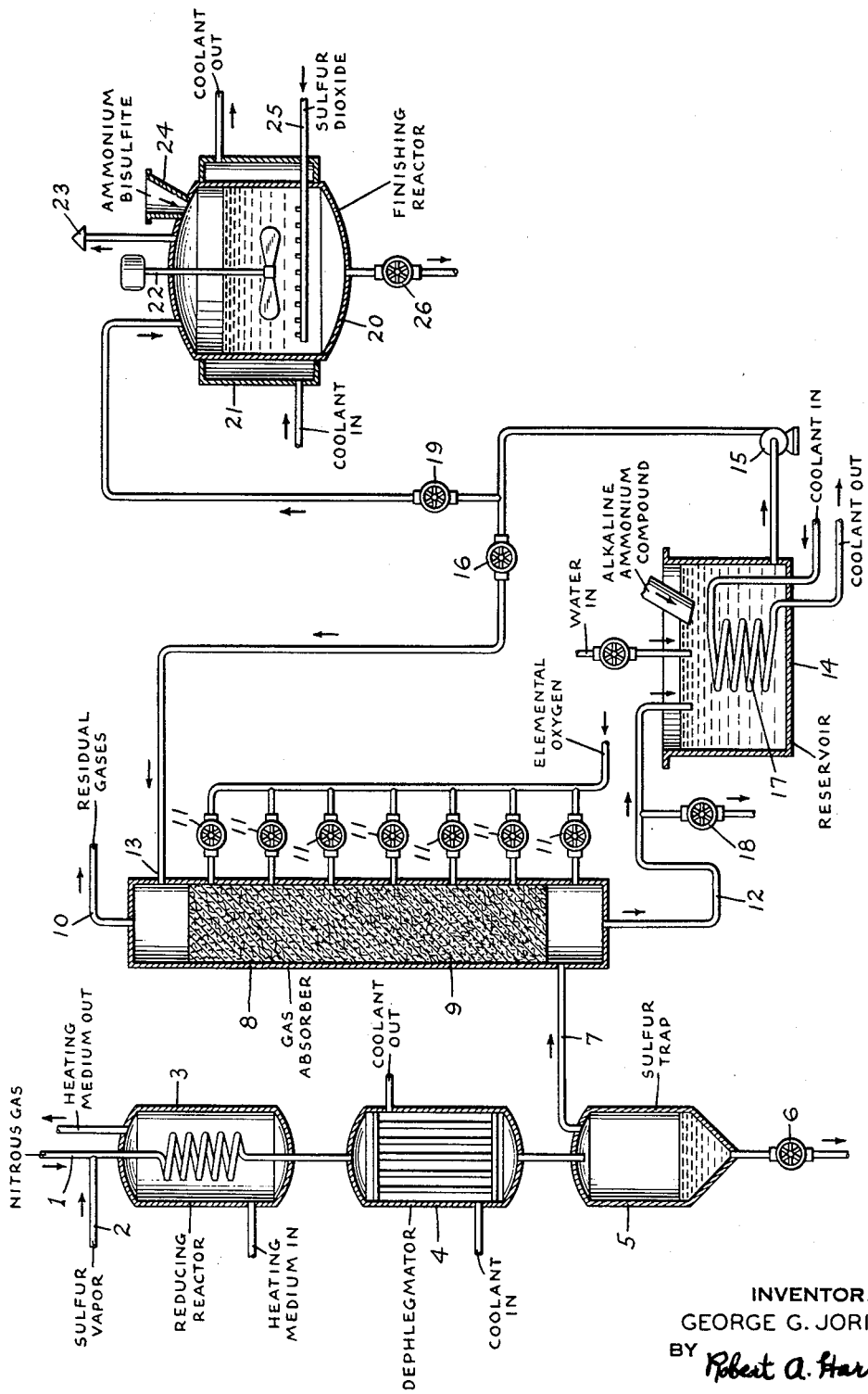

2,752,224
PRODUCING AMMONIUM NITRITE AND AMMONIUM HYDROXYLAMINE DISULFONATE BY A NITROUS GAS ABSORPTION PROCESS

George G. Joris, Madison, N. J., assignor to Allied Chemical & Dye Corporation, New York, N. Y., a corporation of New York Application May 11, 1953, Serial No. 354,144

6 Claims. (Cl. 23—104)

This invention relates to a process for producing ammonium hydroxylamine disulfonate and more particularly to a process for producing it from a nitrous gas.

As used herein the term "nitrous gas" means a gas which consists essentially of nitric oxide and oxygen and/or oxides of nitrogen or higher oxygen content than in nitric oxide; and can be more or less diluted with inert ingredients such as nitrogen, water vapor, carbon dioxide, etc. and with impurities such as ammonia. Exemplary of these gases are the gases obtained from the catalytic combustion of ammonia-air mixtures having less than 16 volume per cent ammonia, from the electric arc combustion of air, from the thermal fixation of nitrogen, and from nitrogen oxide vent streams off absorbers used in the production of nitrates or nitric acid.

Heretofore, indirect processes have been available for making ammonium hydroxylamine disulfonate. They offer a method for suppressing the formation of by-product ammonium nitrate and avoiding substantial decomposition of the intermediate ammonium nitrite in aqueous solution. This material in solution tends to decompose appreciably under absorption conditions at temperatures above 45° C. and, in some absorption processes, at temperatures as low as room temperature, i. e. 20°–35° C. In the prevailing indirect process suitable for making this disulfonate a solution of calcium nitrite is first made by a nitrous gas absorption process; then this solution is treated with ammonium sulfate to precipitate calcium sulfate; the calcium sulfate is subsequently separated; and finally the solution of ammonium nitrite remaining is converted to ammonium hydroxylamine disulfonate by the Raschig process, that is, treatment with sulfur dioxide and ammonium bisulfite at about 0°–5° C. until acidic pH about 2–3 is attained.

The inventment in equipment and in intermediate raw materials coupled with intermediate handling losses and the necessity for by-product disposal detract from the economy of an indirect process.

Accordingly, an objective of my invention is to make ammonium hydroxylamine disulfonate by a process capable of utilizing practically any industrially available nitrous gas in a direct manner, avoiding a complex series of intermediate manipulations, especially those giving substantial by-product formation, yet suppressing ammonium nitrate formation and decomposition of the intermediate ammonium nitrite.

To accomplish this objective I have invented a process for making ammonium hydroxylamine disulfonate which comprises: admixing with nitrous gas at a temperature of at least 150° C. at least one compound of the group consisting of sulfur and hydrogen sulfide in amounts sufficient to produce substantial quantities of sulfur dioxide, and to fix the stoichiometric mol ratio of nitric oxide: oxygen at a value of at least 10:1; bringing the resulting gas into contact with an aqueous solution of a basically-reacting ammonium compound maintained below 45° C.; and adding elemental oxygen to said gas in amounts restricted to keep the stoichiometric mol ratio of nitric oxide: oxygen at least at 10:1, thereby forming ammonium nitrite and ammonium hydroxylamine disulfonate in said solution.

Nitric oxide and oxygen in my gases are in equlibrium with nitrogen dioxide in accordance with the equation:

$$2NO + O_2 = 2NO_2$$

Any nitrogen dioxide in my gases is included, accordingly, as 1 molecular proportion of nitric oxide and ½ molecular proportion of oxygen in calculating "stoichiometric" nitric oxide:oxygen mol ratios; and that is the purpose and effect of using the term "stoichiometric" as employed herein. Conversely, "nitric oxide" content of my gases includes NO combined with the ½ molecular portion of $O_2$ in nitrogen dioxide, as well as free NO; and "oxygen" content includes the ½ molecular proportion of $O_2$ combined with NO in nitrogen dioxide, as well as free molecular oxygen, but is exclusive of the oxygen moiety of the NO itself.

The drawing is a flow sheet showing means adapted for carrying out the invention. Hot nitrous feed gas from inlet 1 and sulfur vapor from inlet 2 are mixed and reacted in reactor 3 wherein sulfur is oxidized to sulfur dioxide. The reacted mixture flows into cooled dephlegmator 4 to precipitate unreacted sulfur, thence to sulfur trap or precipitator 5 wherein unreacted sulfur is separated from the gas and removed by opening valve 6. The resulting gas passes into gas absorber 8 through pipe 7. Gas absorber 8 contains packing 9 and is equipped with vent 10, regulated elemental oxygen inlets 11 at ascending elevations, liquid-sealed drain 12, and irrigation inlet 13. Drain 12 discharges into reservoir 14 which supplies the suction head of pump 15. Irrigation inlet 13 is supplied with liquid from reservoir 14 by pump 15.

The nitrous gas ascends in gas absorber 8 countercurrent to a copious flow of solution maintained alkaline by addition of a basically-reacting ammonium compound to reservoir 14. If desired, water to maintain volume can also be added at this point. Cooling coil 17 maintains the temperature level of the absorption system. Samples or production can be abstracted from drain 12 by bleed 18. Supplementary air inlets 11 are throttled to restrict the quantity of incoming oxygen to maintain a stoichiometric nitric oxide:oxygen mol ratio of at least 10:1 in the ascending nitrous gas.

Pump 15 also discharges the reservoir contents into finishing reactor 20 when valve 19 is opened. Finishing reactor 20 is equipped with a cooling jacket 21, agitator 22, vent 23, ammonium bisulfite hopper 23, sulfur dioxide sparger 25, and product drain 26. Any unconverted ammonium nitrite in the absorbing solution is treated in the finishing reactor 20 with ammonium bisulfite and sulfur dioxide at temperatures in the range from 0°–5°C. until pH 2–3 is obtained, thus converting it to ammonium hydroxlyamine disulfonate. Product solution is withdrawn from drain 26 for use.

The principal reactions taking place during my process can be illustrated by the following equations:

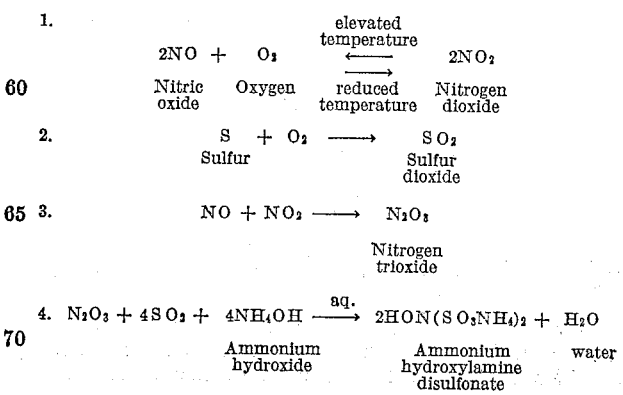

1. $$2NO + O_2 \underset{\text{reduced temperature}}{\overset{\text{elevated temperature}}{\rightleftarrows}} 2NO_2$$
   Nitric oxide + Oxygen → Nitrogen dioxide 2. $$S + O_2 \longrightarrow SO_2$$
   Sulfur + → Sulfur dioxide 3. $$NO + NO_2 \longrightarrow N_2O_3$$
   Nitrogen trioxide 4. $$N_2O_3 + 4SO_2 + 4NH_4OH \xrightarrow{aq.} 2HON(SO_3NH_4)_2 + H_2O$$
   Ammonium hydroxide → Ammonium hydroxylamine disulfonate + water 5. $N_2O_3 + 2NH_4OH \longrightarrow 2NH_4NO_2 + H_2O$
   Ammonium nitrite 6. $NH_4NO_2 + SO_2 + NH_4HSO_3 \xrightarrow{aq.} HON(SO_3NH_4)_2$
   Ammonium bisulfite Nitrous gases from any desired source can be used as charging stocks for the practice of my invention. My invention is particularly applicable to nitrous gases having relatively high concentrations of both nitric oxide and oxygen, such as nitrous gases obtained from ammonia combustion, especially from combustion of ammonia-air mixtures containing about 4 to about 13 volume per cent ammonia. Preferred nitrous gases are burner gases from combustion of 8–9 volume per cent ammonia in air.

Aqueous solutions suitable for my process are those maintained alkaline by the incorporation of, for example, ammonium sulfite, ammonium carbonate, ammonium bicarbonate, ammonium hydroxide, or mixtures of these compounds. Since one mol of ammonium sulfite reacts with one mol of sulfur dioxide to form 2 mols of ammonium bisulfite, ammonium sulfite functions as a reactant for converting the nitric oxide content of the incoming gases to hydroxylamine disulfonate, in accordance with Equation 6 above.

I can employ in my process either sulfur vapor or hydrogen sulfide, or mixtures thereof. They are employed separately or together in amounts satisfying two requirements: (1) the amount must be at least sufficient to consume all excess oxygen in the nitrous gas over that needed for 10:1 stoichiometric mol ratio of nitric oxide:oxygen in the gas; and (2) the amount must be at least sufficient to assure production of substantial quantities of sulfur dioxide. Sulfur dioxide in presence of nitric oxide and oxygen forms sulfur trioxide at temperatures such as about 25° C. Accordingly I prefer to use at least the theoretical quantity of sulfur or hydrogen sulfide necessary to react with all of the oxygen content of my nitrous gases and form sulfur dioxide therewith.

Sulfur as against hydrogen sulfide furnishes a greater amount of sulfur dioxide from the oxygen content of my nitrous gases, which sulfur dioxide functions to accomplish disulfonation by the process of my invention. Sulfur will be preferred for that reason when oxygen content of the nitrous gas is relatively low. Moreover sulfur has the advantage as against hydrogen sulfide that its combustion is non-explosive; it can be recovered from my gases by cooling and the like; and it is inert toward sulfur dioxide and ammonium nitrite in the absorbing solution. Accordingly preferred operations in accordance with my process comprise admixing sulfur vapor with nitrous gases in amounts in excess of the theoretical quantity required to form sulfur dioxide with the whole oxygen content of the nitrous gas.

If desired, minor proportions of other readily-combustible substances such as finely-divided carbon, methane, hydrogen and the like can be present in addition to sulfur and/or hydrogen sulfide. Gaseous substances of this type are suitable to entrain sulfur and bring it into reacting contact with nitrous gas feed.

The nitrous gas-sulfur vapor mixture is maintained at a temperature of at least 150° C. to obtain rapid reaction and to prevent premature separation of sulfur from the gas in process, temperatures from 200° to 450° C. being preferred. At the ammonia burner exit the temperature of ammonia burner bases is about 700°–900° C. Thus some cooling of such gases is in order prior to their introduction to the reducing reactor with the reducing agent, say to 600° C.

The gas having stoichiometric mol ratio of nitric oxide:oxygen of at least 10:1 can be further cooled to reduce the cooling load on the absorption system and, in the preferred operations, to precipitate excess sulfur after the combustion; but if the gas contains water vapor, it should not be cooled to such a degree that water condenses in the feed line and a highly corrosive condition results.

Elemental oxygen is gradually added to the gas undergoing absorption, e. g. in the form of air introduced at successive points along the gas absorption tower, amounts added being restricted to maintain the gas phase stoichiometric nitric oxide:oxygen mol ratio at a value of at least 10:1, thus preventing nitrogen dioxide from accumulating in the gas phase. Such accumulation, I have found, results in lowered yields of desired products. Air is the preferred source of elemental oxygen because of its economy and suitability for my purpose; but any desired strength elemental oxygen can be used to accomplish this controlled oxidation-absorption step of my process, e. g. tonnage oxygen.

While it is possible to operate the absorption system satisfactorily with good yield when solution temperatures are maintained about room temperature, i. e. 20°–35° C. and thus to cool the absorption system with water instead of more expensive refrigerants, I generally employ temperatures in the range between 0° and 5° C. for ease of control. If the temperatures used are as low as to allow ice crystals to form in the absorbing solution, ammonium nitrite is occluded in the ice and this interferes with the completion of disulfonation.

For the best yield of product I prefer to limit to at most 20% by weight the concentration of ammonium nitrite present in the absorption liquor as such and as its ammonium hydroxylamine disulfonate reaction product. Preferably I limit this ammonium nitrite concentration to at most about 12 weight per cent, whereby best yields result. In batch operation the absorber can be shut down and the absorbing solution transferred to the finishing reactor when the desired concentration is reached. In continuous operation one can continuously or incrementally transfer absorbing solution from circulating flow to the finishing operation and make up the remainder of the solution in recirculation to initial volume and alkalinity by adding a basically-reacting ammonium compound and water thereto, employing amounts sufficient to maintain the desired absorbing liquor concentration.

Operation at atmospheric pressure is preferred because of the lower cost of the necessary equipment; however, it is possible, when desired, to operate at elevated or reduced pressures.

Because of its economy and effectiveness for my purpose, I prefer to use countercurrent liquid-to-gas flow in a packed tower for the gas absorption. Commercially available packings such as Berl saddles or Raschig rings are satisfactory packing material. Other gas-to-liquid contacting apparatus also may be used with good results.

For the entire process materials of construction affording good corrosion resistance, such as glass, stainless steel, and aluminum are preferred.

The following is a specific example illustrative of my invention, but is not to be construed as limiting the invention.

*Example.*—Referring to the drawing, nitrous gas, entering inlet 1 at 330° C. and assaying in mol percent about 8.4 NO, 7.9 $O_2$, 13.2 $H_2O$, and 70.5 inert gasses (mostly nitrogen) was admixed with sulfur vapor entering inlet 2, using 6 mols of sulfur (based on the vapor being $S_2$ having the mol. weight 64) per 100 mols of the nitrous gas (i. e. per 2,240 liters at S. T. P.). The mixture was passed through heated reactor 3, wherein it was maintained for about 2 seconds at about 450° C., then cooled in dephlegmator 4 to about 110° C. and passed through sulfur trap 5. The gas stream so treated contained no measurable quantity either of molecular oxygen or of oxygen combined in the form of nitrogen oxides higher than NO, the oxygen content of the original nitrous gas having been practically quantitatively converted to sulfur dioxide.

The gas stream was then admitted near the base of gas absorber 8. Packing 9 was irrigated by an aqueous solution having the initial concentration of 27 weight percent ammonium carbonate, there having been provided about 10 mols of ammonium carbonate per 100 mols of nitrous gas fed. The solution was maintained at 0° C. and circulated at the rate of about 0.5 volume per volume of treated gas feed measured at 100° C.

Simultaneously, air was continuously fed into absorber 8 at supplementary air inlets 11. The air flow at each inlet was throttled sufficiently to maintain the $NO:NO_2$ mol ratio in the gas phase about 10:1 as measured by mass spectrometric analysis of gas samples taken from the absorber at successive elevations. This $NO:NO_2$ mol ratio indicated the maintenance of the stoichiometric nitric oxide:oxygen mol ratio at about 22:1, since, due to the low temperature of the absorption operation, virtually all of the oxygen in the gas phase was combined with NO to form $NO_2$.

The gas feed was stopped and the solution was transferred to finishing reactor 20 for working up products when it contained about 1.35 mols of ammonium nitrite, about 0.62 mol of ammonium hydroxylamine disulfonate, about 1.09 mols of ammonium sulfite, and 0.62 mol of ammonium bicarbonate per liter. The concentrations of ammonium nitrite and ammonium hydroxylamine disulfonate corresponded to about 12 weight percent concentration of free ammonium nitrite as such and as its ammonium hydroxylamine disulfonate reaction product. About 1.7 mols of nitrogen gas was produced per 100 mols of nitrous gas processed.

This solution was suitable for disulfonation at about 0°–5° C. by first adding sulfur dioxide to lower the solution pH to about 6, then adding ammonium bisulfite in about equimolar ratio with the ammonium nitrite still unreacted in the solution as determined by ultra-violet analysis, and finally adding sulfur dioxide in amounts in the range of 1–2 mols per mol of ammonium bisulfite employed, until pH is about 3.5.

I claim:

1. A process for producing a reaction product containing ammonium nitrite and ammonium hydroxylamine disulfonate which comprises admixing a nitrous gas, said nitrous gas containing nitric oxide and oxygen additional to any oxygen derived from the nitric oxide component, said additional oxygen being at least one member of the group consisting of molecular oxygen and oxygen combined with nitric oxide to form nitrogen dioxide, at temperature of at least about 150° C. but not above about 600° C. with a combustible reducing agent consisting essentially of at least one material of the group consisting of sulfur and hydrogen sulfide in amounts sufficient to produce substantial quantities of sulfur dioxide, and to fix the stoichiometric mol ratio of nitric oxide:oxygen in the gas i. e. the nitric oxide:oxygen mol ratio including any nitrogen dioxide in the gas as the stoichiometrically equivalent amount of nitric oxide and oxygen at a value of at least 10:1; bringing the resulting gas into contact with an aqueous solution of a basically-reacting ammonium compound maintained below 45° C.; and adding elemental oxygen to said gas in amounts restricted to keep the stoichiometric mol ratio of nitric oxide:oxygen therein at least at 10:1, thereby forming ammonium nitrite and ammonium hydroxylamine disulfonate in said aqueous solution.

2. Process as defined in claim 1 wherein the nitrous gas is admixed at temperature of 200°–450° C. with sulfur vapor, the sulfur vapor being employed in amounts in excess of the theoretical quantity required to form sulfur dioxide with the entire oxygen content of the nitrous gas.

3. Process as defined in claim 2 wherein the nitrous gas is obtained from the catalytic combustion of ammonia-air mixtures containing 4 to 13 volume percent ammonia.

4. Process as defined in claim 2 wherein the basically-reacting ammonium compound is ammonium sulfite.

5. Process as defined in claim 2 wherein the nitrous gas is obtained from the catalytic combustion of ammonia-air mixtures having 8–9 volume percent ammonia and the elemental oxygen added during the absorption step is in the form of air.

6. Process as defined in claim 5 wherein the aqueous solution contacted with gas is maintained between 0° and 5° C. and the concentration of ammonium nitrite, present in said solution as such and as its ammonium hydroxylamine disulfonate reaction product, is limited to at most 20% by weight.

References Cited in the file of this patent

UNITED STATES PATENTS 2,555,667  Zeegers _____ June 5, 1951

OTHER REFERENCES

J. W. Mellor's "A Comprehensive Treatise on Inorganic and Theoretical Chemistry," 1928 ed., vol. 8, page 433; Longmans, Green and Co., New York.

J. W. Mellor's "Modern Inorganic Chemistry," 8th ed., revised Jan. 1935, page 639; Longmans, Green and Co., New York.